United States Patent Office 3,526,461
Patented Sept. 1, 1970

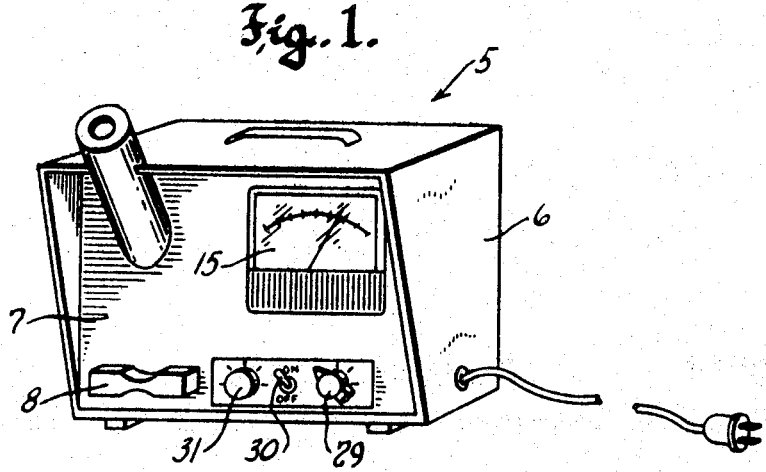
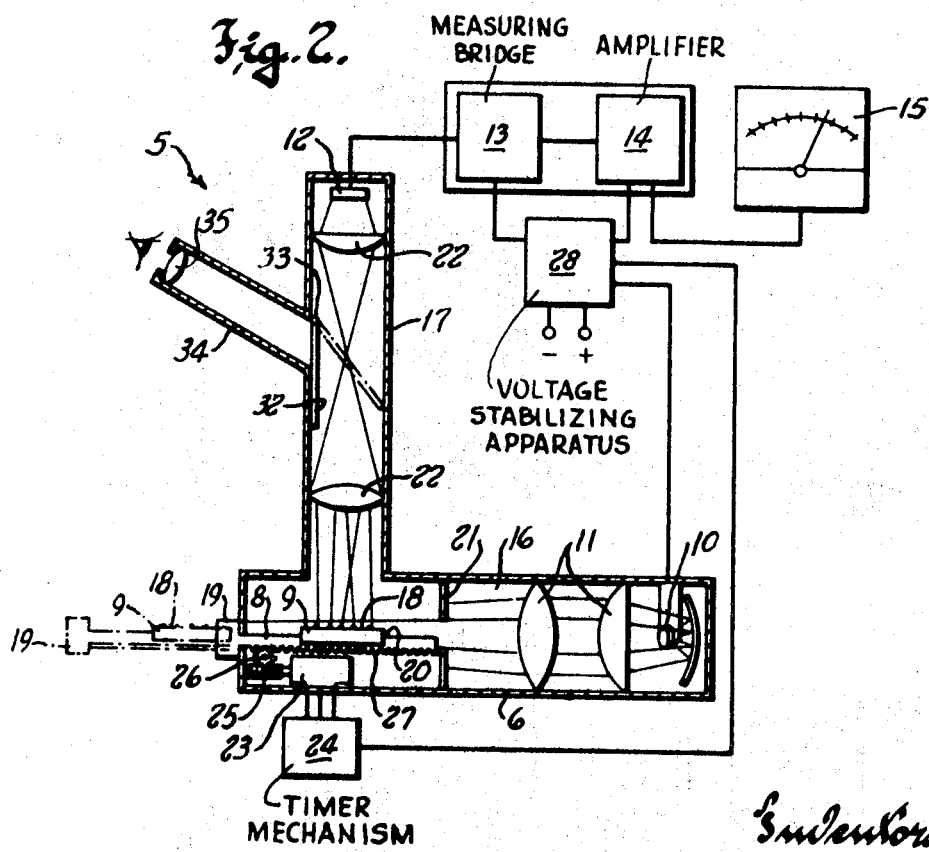

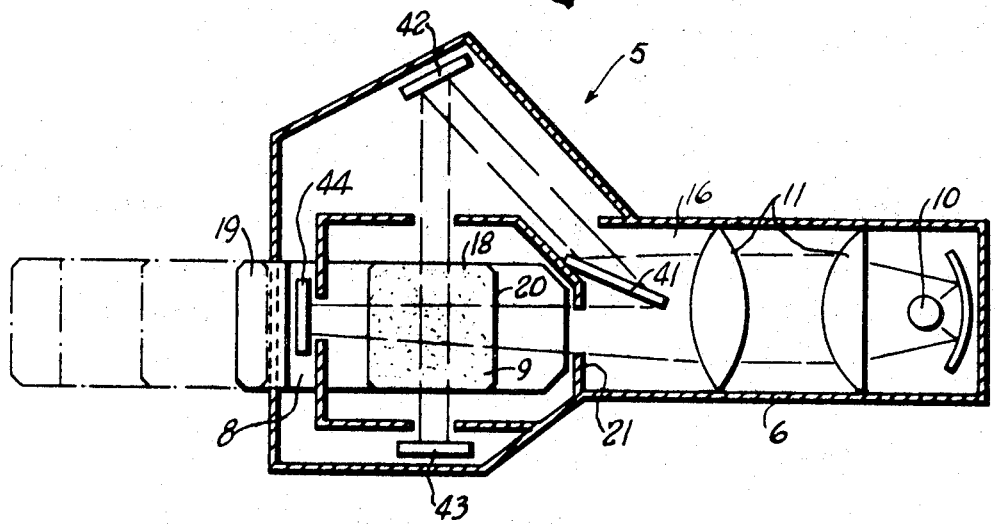

3,526,461
DETERMINING CLEANNESS OF AIR IN A CONTROLLED ENVIRONMENT
Bo Oscar Lindahl and Valentin Lamme, Jonkoping, Sweden, assignors to SAAB Aktiebolag, Linkoping, Sweden, a corporation of Sweden
Filed Apr. 24, 1967, Ser. No. 633,124
Claims priority, application Sweden, Apr. 27, 1966, 5,681/66
Int. Cl. G01n *1/00, 21/00, 33/28*
U.S. Cl. 356—38                                                        6 Claims

ABSTRACT OF THE DISCLOSURE

A slide having a dark, accurately flat top surface is exposed to air to be sampled. A beam of light is directed across said surface, parallel thereto. Only accumulated dust particles on said surface reflect light in directions nonparallel thereto and the light they thus reflect is concentrated on a photo-responsive element. Its response affords an indication of quantity of particles on the slide.

---

This invention relates to a method and apparatus for determining the cleanness of air in a so-called clean room, wherein a controlled environment is maintained for the manufacture of very delicate precision instruments or for similar operations requiring a dust-free atmosphere; and the invention refers more particularly to a method and means for determining dust count in a particular body of air on the basis of dust particles collected on a slide that has been exposed in such air for a predetermined time interval.

The very precise navigation and control instruments used in high performance aircraft and in space vehicles must be assembled in a very carefully controlled environment, since even the slightest accumulation of dust in the mechanism of such an instrumentality is very prejudicial to the extreme precision that is required of it. For the assembly of such instruments, and for other purposes, it is now rather common to provide a so-called clean room, that is, an enclosure in which every precaution is taken against the presence of airborne dust particles and wherein, as a rule, the temperature and humidity of the air are also very closely controlled.

Obviously the environmental conditions in a clean room must be carefully and consistently monitored to insure that they are within prescribed limits. Of particular importance is the determination of the number of dust particles per unit volume of air in the enclosure.

A count of airborne dust particles is conventionally made by exposing a collecting plate or slide in the controlled environment chamber for a predetermined time interval, and then determining the quantity of dust that has settled on the plate, from which, by calculation, a reliable estimate can be made of the number of airborne dust particles that were present in each unit volume of air in the enclosure during the interval of slide exposure.

Heretofore the usual method of inspecting an exposed plate to make a determination of the number of dust particles accumulated on it has been to use a microscope for a direct visual count of the particles. This method was tedious and time consuming, and had the further disadvantage of requiring that the plate or slide be absolutely clean when initially exposed. Furthermore such ocular counting was not completely reliable because of the uncertain subjective element involved in the counting of microscopic particles of varying sizes dispersed in an irregular pattern.

By contrast it is a general object of this invention to provide a method and apparatus for mechanically indicating the relative number of dust particles on an exposed plate or slide, and whereby such indication is obtained almost instantaneously, with a high degree of accuracy and without the need for subjective judgment or evaluation of ocular observations.

It is also an object of this invention to provide a method and apparatus for indicating the number of particles that have been collected on an exposed plate during a certain interval, which method and apparatus imposes no requirement that the plate or slide be free of dust particles when initially exposed but on the contrary makes possible an accurate allowance or accommodation for a so-called ground level of particles on the plate.

Another object of this invention is to provide apparatus for monitoring the presence of airborne dust in a controlled environment enclosure, by which apparatus a plate or slide can be automatically exposed to air in the enclosure at predetermined times, for predetermined intervals, and with which the dust content of the air can be ascertained almost instantaneously after each exposure.

A further object of this invention is to provide apparatus of the character described for ascertaining the relative dust content of air in a selected environment, as represented by particles collected on a plate or slide that has been exposed to such air, wherein optical means are provided that enable direct ocular examination of reflections from particles collected on the plate or slide so that the presence of particles of any unusual type can be detected.

With the above and other objects in view which will appear as the description proceeds, this invention resides in the novel method and in the construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate complete examples of physical embodiments of the invention, constructed according to the best modes so far devised for the practical application of the principles thereof, and in which:

FIG. 1 is a front perspective view of apparatus embodying the principles of this invention;

FIG. 2 is a more or less diagrammatic view of the apparatus shown in FIG. 1, generally corresponding to a vertical sectional view with the principal electrical and electronic components of the apparatus and their interconnections illustrated in block diagram form; and FIG. 3 is a view in horizontal section through the bottom portion of a modified embodiment of the apparatus.

In general, the principle upon which this invention is based is as follows: A slide or plate that has a dark, very flat top surface is used for the collection of dust particles from air to be sampled. A beam of light is directed across said surface, parallel thereto, and because of the nature of the surface, none of such light is reflected upwardly by the surface itself. But dust particles accumulated on the surface do reflect the light in directions nonparallel to the surface, and the diffused light which they thus reflect is collected and concentrated upon a sensitive photoelectric cell or other photoresponsive element. By measuring the response of that element to the light thus reflected from the dust particles, an indication is obtained of the quantity of dust accumulated on the slide or plate, and hence of the quantity of dust per unit volume of air that was present in the sampled body of air during the time the slide was exposed.

Referring now to the accompanying drawing, the numeral 5 designates generally apparatus embodying the principles of this invention embodied in a readily portable unit comprising a light-proof housing 6 with a nonreflecting interior surface and having a front wall or panel 7 on which all controls for the apparatus are accessibly located. Slidable into and out of the housing through its front wall 7 is a drawer-like plate carrier 8 having a receptacle 20 at its top in which a slide or plate 9 is receivable to be established in fixed relation to the plate carrier. Inside the housing a light source 10 and condenser lenses 11 are arranged to direct a beam of light across the top of a plate on the plate carrier in a manner consistent with the principles just explained. Also mounted in the housing is a photoresponsive element 12, in this case illustrated as a sensitive photoelectric cell that is connected, through a measuring bridge 13 and an amplifier 14, with suitable readout means 15 which can comprise, as shown, a meter mounted on the panel 7.

More specifically, the interior of the housing can be substantially L-shaped in vertical section, as best seen in FIG. 2, having an elongated horizontal chamber 16 that is communicated near one of its ends with an elongated upright chamber 17. The photoresponsive element 12 is mounted near the top of the upright chamber 17. The light source 10 is mounted near that end of the horizontal chamber 16 which is remote from the junction of the two chambers.

Near the junction of the two chambers 16 and 17 the draw-like plate carrier 8 is mounted for sliding horizontal motion between a plate-exposing position and a plate-inspecting position. When the plate carrier 8 is in its plate-exposing position outside the housing, illustrated in broken lines in FIG. 2, it exposes the flat top surface 18 of the plate for collection of dust particles that settle out of the air. When the carrier 8 is in its plate-inspecting position a front flange 19 or the like on the carrier cooperates with its adjacent portion of the front panel 7 to provide a dust and light seal that prevents entry of dust and light into the interior of the housing. In that position of the carrier 8 a plate thereon is beneath and in line with the photoresponsive element 12 and is edgewise in line with the light source 10.

The plate or slide 9 must have a dark, very finely finished, accurately flat top surface. The condensing lenses 11 extend across the horizontal compartment between the light source and the plate carrier and cooperate with an apertured screen 21 that is similarly mounted to cause light rays from the light source to be aligned substantially parallel with the top surface of the plate.

Because of the dark, smooth top surface on the plate and the orientation of the light beam that shines across it, the plate itself reflects no light upwardly toward the photoresponsive element 12. However any dust particles on the plate will reflect light generally upwardly. Such reflections from the dust particles will be somewhat diffused, inasmuch as they will not necessarily be parallel to the axis of the upright chamber 17, but they are collected and concentrated or focused upon the photoresponsive element by means of a lens system 22 in the upright chamber.

It will now be apparent that the quantity of light falling upon the photoresponsive element 12 is substantially in proportion to the number of dust particles present on the plate.

If the photoresponsive element is a photographic film, the light source has to be energized for only a predetermined time interval, or a suitable shutter must be arranged in the housing, and the film must be developed. After development, the extent of exposure of the film can be determined by reference to readout means comprising a known type of comparison scale, calibrated in terms of dust particles per unit volume of air.

Preferably the photoresponsive element is a sensitive photoelectric cell which converts the flux of light falling upon it to a voltage, current or frequency that is a known function of the intensity of that flux. The measuring bridge 13 to which the photoelectric cell is connected is of known type and functions to provide an output which is derived from a comparison between the output of the photoelectric cell and a reference voltage, current or frequency. The output of the bridge 13 is fed, through the amplifier 14, to the readout means 15, which is illustrated as a meter. The relative deflection of the meter needle provides an indication of the number of dust particles on the slide being inspected, and the meter can thus be directly calibrated, if desired, in terms of number of dust particles per unit volume of air.

It will now be apparent that the present invention makes it unnecessary to insure that the collecting surface of the plate or slide 9 is absolutely dust-free before exposure for dust collection, since all that is needed is to subject the plate to inspection according to the principles of this invention immediately before exposure, in order to establish a ground value, and then subtract this ground value from the value obtained by inspection after dust collecting exposure. In fact, under some circumstances, the same plate could be repeatedly exposed for dust collection without being cleaned between exposures, the reading obtained from inspection after each dust collection exposure being taken as the ground value for the next exposure. This would be particularly feasible where the readout means 15 was of the type that made a permanent record.

To render the apparatus completely automatic in operation, the plate carrier 9 can be arranged to be moved from one to the other of its positions by means of a small reversible electric motor 23 connected with a timer mechanism 24 of known type. A worm 25 on the shaft of the motor 23 meshes with a pinion 26, which in turn meshes with a rack 27 fixed on the plate carrier.

Assuming that a clean slide is in the carrier and that the carrier is initially in its slide-inspecting position, the timer 24 can energize the motor 23 at a predetermined time to cause the motor to drive the plate carrier to its slide-exposing position. After a predetermined dust collecting exposure of the slide, the timer 24 again energizes the motor 23, but in the opposite direction, to bring the plate carrier back to its slide-inspecting position. The arrangement just described is particularly advantageous if the apparatus has readout means of the type that makes a permanent record.

Those skilled in the art will appreciate that suitable mechansim can be arranged to enclose the slide after it is cleaned and while it is being placed in the plate carrier, and in which it is kept enclosed to remain dust free until it is intended to be exposed for collection of dust particles. With this arrangement the apparatus can either be placed more or less permanently in a clean room to be monitored or can be centrally located to have slides exposed in different rooms brought to it for inspection in closed containers of the kind just mentioned.

It will be understood that the reliability of the results obtained with the apparatus is dependent upon a consistently uniform intensity of light from the light source (which can be a suitable incandescent bulb). To this end the light source is preferably connected with its energizing current source through a voltage stabilizing apparatus 28 of known type, which can also be connected with the measuring bridge 13 to provide its reference current.

Because the amount of dust collected on exposed plates may vary widely from time to time and from place to place, it is preferable to provide a multiposition selector switch, having an actuator 29 that is accessibly mounted on the panel 7, for selecting different measurement ranges for the instrument. The actuator 30 for a master switch by which the apparatus can be turned on and off, and a time interval adjusting control 31 for the timer 24, can also be mounted on the panel 7.

It is desirable to have some idea of the size and character of the dust particles collected on a plate, as well as of their number. To this end a mirror 32 can be mounted in the upright chamber 17, connected to one wall thereof by means of a hinge 33 or the like by which the mirror is swingable between an inoperative position flatwise overlying said wall and an operative position extending obliquely across the upright chamber. An observation tube 34 extending obliquely down into the upright chamber is so arranged that light reflected by the mirror when the latter is in its operative position is directed upwardly along the observation tube to an enlarging eyepiece 35 at its upper end. A suitable measuring scale can be associated with the eyepiece 35 to aid in evaluating the size and character of the dust particles being observed.

In the modified embodiment of the apparatus illustrated in FIG. 3, provision is made for lighting dust particles on the plate 9 from several different directions that are parallel to its flat top surface 18.

In the beam of light from the light source 10 there is mounted an upright mirror 41 that extends part way across the lower horizontal chamber, entirely to one side of the light aperture in the apertured screen 21, and which reflects a part of the light from the light source onto a second upright mirror 42 located to one side of the direct path between the light source and the plate 9. From the second mirror 42 the light rays are reflected across the plate, parallel to its surface 18, at right angles to the beam that emanates directly from the light source. A third upright mirror 43, mounted at the side of the plate 9 remote from the second mirror 42, reflects back across the plate the light from the mirror 42. A fourth upright mirror 44, at the side of the plate remote from the light source, reflects back across the top of the plate the light coming directly from the light source.

With the mirror arrangement just described, dust particles on the plate are illuminated by light from four different directions, insuring that every dust particle, regardless of its shape and orientation, will contribute its due portion to the quantity of light falling upon the photoresponsive element. If light were to shine across the plate from only one direction, the amount of reflection given off by an elongated dust particle, for example, might be either disproportionately small or disproportionately large, depending upon whether the particle was endwise aligned with the light source or extending transversely to it.

From the foregoing description taken together with the accompanying drawing it will be apparent that this invention provides a method and apparatus for quickly and accurately determining the dust count in a particular body of air on the basis of dust particles collected on a slide or plate that has been exposed to the air being monitored.

What is claimed as our invention is:

1. Apparatus for producing an output indicating the relative dust content of a particular body of air, said apparatus comprising:
   (A) a slide having a dark, smooth and flat top surface, adapted to be exposed in a body of air to have a portion of the dust therein deposited on said surface;
   (B) a light proof housing having a nonreflecting interior;
   (C) means for holding the slide in a predetermined position within said housing;
   (D) means in the housing for directing light across and substantially parallel to said top surface of the slide so that the only light reflected upwardly from said surface is that from dust particles thereon;
   (E) a photoresponsive element in the housing;
   (F) means in the housing for collecting and concentrating upon the photoresponsive element the light reflected upwardly from said surface of the slide; and
   (G) means for indicating the response of the photoresponsive element to the light reflected upwardly from the top surface of the slide, for affording an indication of the relative amount of dust thereon.

2. The apparatus of claim 1 further characterized by:
   (A) said means for holding the slide in the housing comprising a drawer-like carrier movable between a slide-exposing position in which a slide on the carrier is outside the housing and a slide-inspecting position in which the slide is within the housing; and
   (B) cooperating means on said carrier and on the housing providing a seal which prevents entry of light and dust into the housing when the carrier is in its slide inspecting position.

3. The apparatus of claim 2, further characterized by:
   (A) mechanical means for moving said carrier between its said positions; and
   (B) timer means operatively associated with said mechanical means and controlling the same for automatically moving the carrier to each of its said positions at predetermined times to thereby control the period during which the slide is exposed.

4. The apparatus of claim 1 wherein said housing comprises means defining an elongated chamber having said means for holding the slide near one end thereof and said photoresponsive element near the other end thereof, further characterized by:
   (A) a mirror mounted for swinging motion between an inoperative position along one side of said chamber and an operative position extending across the chamber and in which it deflects laterally of the chamber light rays reflected upwardly from the top surface of the slide; and
   (B) optical means opening into the chamber at one side thereof and having an axis which intersects the reflecting surface of the mirror when the latter is in its operative position, and whereby reflections from dust particles on the top surface of the slide can be directly visually observed.

5. The apparatus of claim 1 further characterized by:
   (A) the photoresponsive element comprising a photoelectric cell; and
   (B) said means for indicating the response of the photoresponsive element comprising a meter connected with said photoelectric cell through amplifier means.

6. The apparatus of claim 1, further characterized by: reflector means disposed normal to the plane of said top surface of the slide and arranged to reflect a part of the light from said light source across said surface of the slide and parallel thereto in a direction different from the direction of light which emanates directly from said source, whereby dust particles on the slide are illuminated from different directions.

References Cited

UNITED STATES PATENTS

| | | | |
|---|---|---|---|
| 2,076,553 | 4/1937 | Drinker et al. | 356—38 |
| 2,076,554 | 4/1937 | Drinker et al. | 356—38 |
| 3,309,956 | 3/1967 | Hach | 356—103 |

FOREIGN PATENTS 659 10/1911 Great Britain.

RONALD L. WIBERT, Primary Examiner

W. A. SKLAR, Assistant Examiner

U.S. Cl. X.R.

235—92; 250—218; 356—103, 207